Feb. 6, 1973

J. K. KOUGH ET AL

BLOWBACK SEAL FOR BUILDING PANELS

Filed Jan. 24, 1969

Re. 27574

INVENTORS.
JOHN K. KOUGH
BLAIR B. KOUGH

BY Jack M. Wiseman

ATTORNEY

United States Patent Office

Re. 27,574
Reissued Feb. 6, 1973

27,574
BLOWBACK SEAL FOR BUILDING PANELS

John K. Kough and Blair B. Kough, Morgan Hill, Calif., assignors to Ditz-Crane, San Francisco, Calif.

Original No. 3,509,676, dated May 5, 1970, Ser. No. 793,865, Jan. 24, 1969. Application for reissue July 15, 1970, Ser. No. 55,297
Int. Cl. E04d *1/26, 1/36*
U.S. Cl. 52—541 9 Claims

Matter enclosed in heavy brackets [ ] appears in the original patent but forms no part of this reissue specification; matter printed in italics indicates the additions made by reissue.

ABSTRACT OF THE DISCLOSURE

Disclosed is a panel a plurality of which may be used to surface the exteriors (roof and/or sides) of buildings. The panel is prefabricated and incorporates the sheathing, waterproofing, singling and shakes often found in building surfacing of high quality and is installed in abutting vertical courses each course containing as many adjacent panels as required by the roof dimensions. The panel is substantially modular so that only a small amount of on-site custom fitting is required as compared to conventional construction. In addition, the panel includes provision for inhibiting the seepage of water into the building attic even as a result of rain driven by intense wind.

BACKGROUND OF THE INVENTION

This invention relates to means for covering the exteriors of buildings and, more particularly, to a panel which incorporates all of the materials frequently used for this purpose in one prefabricated assembly.

For many reasons, including weather resistance and attractiveness, a preferred covering for building exteriors has been shingles and shakes applied over a sheathing and waterproofing membrane. A considerable number of prior attempts have been made to provide shake roofing or siding which would avoid some or all of the conventional steps of bundling the shakes, transporting the bundles to the site, applying sheathing, applying waterproof membrane, hoisting the bundles of shakes to the roof or scaffold, breaking the bundles, and then applying the shakes, one at a time, all of which steps involve not only risk of damage to the building materials but increased time of installation and its attendant labor expense. Some of these structures have indeed shown substantial cost savings but have not been sufficiently weather tight to permit universal use, others have not had satisfactory shake surface appearance and still others have proven too costly to be competitive. A panel characterized by none of the above deficiencies has been invented; it is shown, described and claimed in copending patent application Ser. No. 775,731, filed Nov. 14, 1968 *and now abandoned.*

An examination of the aforementioned application will indicate that, for the first time, specific provision has been made in a building panel to attack the problem of entrance of moisture from rain or other water source up into the interstices under and between components of the panel and onto the building attic. Despite the waterproof membrane which forms part of the panel, however, when the moisture is driven as by a harsh wind, the panel structure has been found not as efficient as desired in coping with this "blowback" penetration. The specific provision referred to above, as disclosed in the referenced application, comprises a panel assembly in which a membrane portion extending beyond the tops of the shingles and shakes if folded over the top edges of the latter and is stapled down to the upper surfaces of the shakes or, in the alternative, an additional section of membrane may be installed in this fashion. This type of installation had been expected to provide a complete dam to blowback moisture because the resulting panel structure includes a double membrane barrier at the interstice between the bottom of the shingle of one panel and the top of the shake of the subjacent panel and a membrane barrier on the joints between shingles.

SUMMARY OF THE INVENTION

However, the above expectation has been only partially fulfilled; the described structure has been found to perform quite satisfactorily under weather conditions which cause moderate blowback, but does not provide an absolute moisture barrier under very severe conditions. Investigation has shown that moisture driven by exceptionally high winds may seep sufficiently so as to wet down the undersides of the shingles and shakes, and, at times, even the sheathing, and it has been concluded that entrances for moisture occur between shakes and between shingles and at the tops of the shakes between their irregular upper surfaces and the section of the membrane which is above them.

The present invention, therefore, comprises means to provide a flat, regular surface adjacent the top of the shingles and shakes, with which surface the membrane makes consistent and continuous contact and also provides a solid barrier against wind-driven moisture along the entire length of the panel. In its preferred embodiment, the improvement takes the form of a barrier furring strip of wood of thickness sufficient to [poject] *project* slightly above the upper surfaces of the shakes regardless of the combined thickness of shingle and shake at the top of the panel and which provides a wall facing the upper ends of the shingle-shake assemblies.

DESCRIPTION OF THE PREFERRED EMBODIMENT

Figure 1:
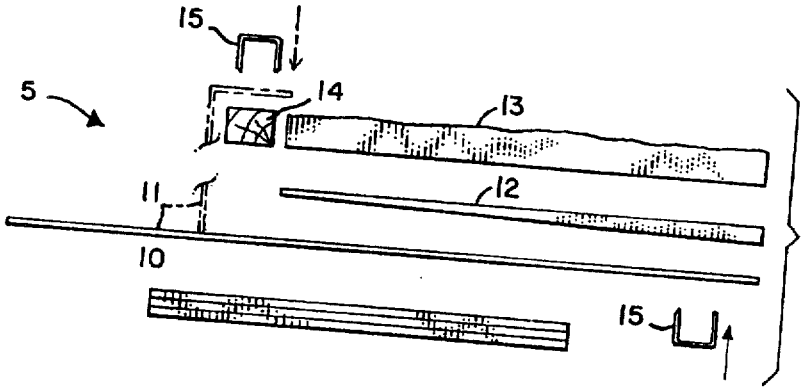
FIG. 1 is a side elevation showing the elements of the present novel building panel separated from each other.

Referring to FIG. 1, the roof or walls of a building can be covered with what appears to be individually-applied natural wood shakes by means of a plurality of preassembled panels 5, which can be applied in a uniform and symmetrical manner by any roofer or carpenter, or even by an amateur having no special training or high degree of skill.

Each panel 5 comprises base strip 10, which may be a board, but preferably is of exterior-grade plywood, about 12 inches wide and 6 or 8 feet long. Each base strip 10 is covered with membrane 11 of suitable material such as tarred felt, which is coterminal with the ends of strip 10, but may extend somewhat beyond its edges.

Upon membrane 11 and spaced downwardly (i.e. to the right in FIG. 1), for instance 2 inches, from the upper (left) edge of strip 10, is attached furring strip 14, a length of one inch wood, and abutting strip 14, there are laid a course of shingles 12 and shakes 13. Shingles 12 are of the conventional sawn type, of random width and about 15 inches long and are flush with both ends of strip 10.

Upon each course of shingles 12 is laid a course of shakes 13, which may be like conventional shakes in that one side would be formed by splitting and the other side by sawing, or may have both sides split. Shakes 13 and shingles 12 are attached to base strip 10 in any suitable manner, such as by nailing.

In making conventional shakes, wood blocks of random width, usually 24 inches long, have shake blanks of varying thickness from ½ inch to 1¾ inches split therefrom. These shake blanks are then sawn in two, usually free hand, by a diagonal band saw cut running from one end of the blank to the other. This saw cut divides each blank into two shakes, each shake having a feather edge of substantially zero thickness at one end thereof, and the full thickness of the blank at the other. Any waviness in this diagonal saw cut results in a thin spot in one of the shakes and a corresponding thick spot in the other.

In making shakes 13 of the present invention, however, the shake blanks need not be as long as for regular shakes; a preferred length is only 15 inches. Also, the shake blanks are all approximately one inch in thickness and may be produced by division in two medially of their thickness as split by a straight saw cut parallel to one side of the blank, since shakes 13 are of approximately even thickness throughout their length, or by splitting at both sides according to the thickness desired. These are important simplifying, cost reducing and safety factors in the manufacture of shakes, since it is a dangerous and exacting job to make the free hand diagonal cuts which produce regular shakes, while the illustrative shakes 13 can be made on automatic or semi-automatic machinery, using a fence parallel to the plane of the saw blade as a guide or by automatic splitting machinery only (i.e., without sawing).

The portion of the shakes which are exposed to the weather can be varied by varying the width of strip 10 and the spacing of the upper ends of shakes 13 from the upper edge of strip 10. Suitable dimensions are as follows:

The lower end of membrane 11 and the lower ends of shakes 13 and shingles 12 superposed thereon project 6 inches below the lower edge of strip 10; shakes 13 and shingles 12 each are 15 inches long; strip 10 is ½ inch thick and 12 inches wide; strip 14 is of a thickness sufficient such that its upper surface is slightly higher than the height of the shingle-shake abutting end, may serve as a gauge for positioning the next high or lower panel, and is spaced 2 inches from, and parallel to, the upper edge of strip 10 upon which it is laid; membrane 11 extends about 1 or 2 inches above the upper edge of strip 10; the length of panel 5 may be 6 or 8 feet but may be varied at the option of the manufacturer or contractor. While these measurements are not limiting, they provide admirable siding or roofing, having about 11 inches of the shakes exposed as weatherlap.

In conventional roofing, sheathing may be laid solidly at the roof eaves and rakes whereas sheathing boards elsewhere may, for economy, be spaced. Solid sheathing is used at the eaves and rakes to provide a good appearance since their undersides are visible, and it is desired to avoid the unsightly contribution of the membrane, especially if it should sag. The panels of the present invention obviate this disadvantage since, in an installation, only the material (i.e., wood) of base strips 10 are seen in a fairly attractive lapped form. Thus, no special provision need be made to decorate or hide the undersides of eaves and rakes.

As already indicated, one of the most vexing problems in roof construction results from the seepage of water from rain or other moisture up into the interstices under and between shakes and shingles and into the building attic, a situation which is enhanced by the irregular upper surfaces of shakes 13. Ordinarily, the membrane often is found incapable of damming it or directing it to flashing and gutters so that it will be dissipated harmlessly. The present invention includes means to obviate this "blowback" effect completely. Accordingly, as shown in dashed line in FIG. 1, when panel 5 is assembled, membrane 11 may be folded around furring strip 14 to extend above the top ends of shingle 12 and shake 13 and attached by means of staples 15 or nails, or if a double layer of waterproofing is considered advisable, membrane 11 may be permitted to lie flat on strip 10 and an additional width of waterproofing material inserted (preferably between membrane 11 and shingle 12, folded around and stapled as indicated above). As will soon be shown, this type of installation provides a double membrane barrier at the interstice between the bottom of the shingle of one panel and the top of the shake of the subjacent panel and a membrane barrier to blowback moisture which may seep upward in the joints between shingles. As should be apparent, this type of structure is admirably suited to simpler installations which may provide only a single layer of wood instead of both shingles and shakes; contemplated as illustrative would be plywood sheathing under asbestos membrane under a shake layer, a structure which would reduce fire hazard as well as provide water resistance.

Figure 2:
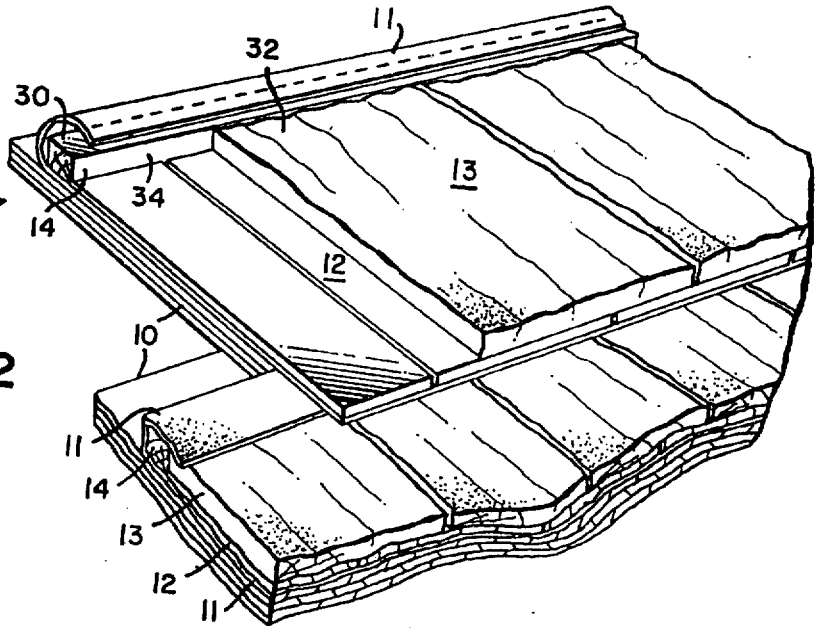
FIG. 2 is an oblique view of the present building panel.

FIG. 2 shows the end of panel 5, illustrating how upper surface 30 of furring strip 14 extends slightly above upper surface 32 of shake 13 at edge 34 of strip 14 where the ends of shingle 12 and shake 13 abut. Membrane 11 thus may be attached to strip 14 in close contact along their lengths.

It may be well to review briefly some of the desirable features and advantages possessed by the panels of the invention.

To a substantial extent, the panel may be made up at the factory, shipped on open flat railway cars (contrary to bundles of shingles and shakes which require protection during shipment) and may be handled easily with standard equipment (fork lifts, etc.) since they are not considered fragile. Transportation is economical since a square in panel form occupies approximately the same space as a square of shingles and shakes, i.e., the base strip, sheathing and membrane are transported at very little cost. At the site, since an 8 foot panel weighs about 40 pounds and is reasonably dimensioned, it lends itself to conveying by belt, elevator, etc. systems and it can easily be handed up from the ground to the roof without employing machinery and, over most of the roof area, does not need to be cut because the ends need not meet over rafters; thus it lends itself to homeowner or nonprofessional installation as well as installation by trained craftsmen. Code inspection problems are minimized because of factory assembly and also because of the self-gauging feature for adjacent courses, the high degree of self-support and its adaptability to fool-proof watertight installation. The latter features also make the panel well suited for walls and roofs in snow country without extra provision for support at overhangs, etc.

While the invention has been shown and described with reference to preferred embodiments thereof, it will be understood by those skilled in the art that various changes in form may be made without departing from its spirit and scope.

What is claimed is:

1. A panel for surfacing buildings, comprising:

a base sheathing strip;

a membrane extending over said sheathing strip;

a furring strip laid along the length of said sheathing strip and over said membrane;

a layer of roofing laid along the length of said sheathing strip and over said membrane and abutting against said furring strip; and means to attach an extending end of said membrane to the upper surface of said furring strip so that said membrane folds over said furring strip to form a watertight seal therebetween.

2. The panel of claim 1 wherein said roofing comprises a layer of shingles and the like and a layer of shakes and the like thereover.

3. The panel of claim 1 wherein the upper surface of said furring strip extends above said roofing at the abutment.

*4. A panel, a plurality of which are installed in abutting relationship in a generally vertical course for surfacing*

*buildings, the panel comprising a sheathing having top and bottom edges, roofing material of the type comprising a plurality of shingles or shakes and having top and bottom edges and being fixed to said sheathing along the length of said sheathing so that the top edge of said roofing material is parallel to and spaced from the top edge of said sheathing, a strip fixed to said sheathing and located between the top edge of said sheathing and the top edge of said roofing material so that one surface of said strip confronts said sheathing and another surface of said strip confronts the top edge of said roofing material, said strip being parallel to and in the vicinity of the top edge of said sheathing.*

*5. A panel in accordance with claim 4 wherein said one surface of said strip is parallel with the confronting surface of said sheathing.*

*6. A panel in accordance with claim 5 wherein said other surface of said strip is perpendicular to said confronting surface of said sheathing.*

*7. A panel in accordance with claim 6 wherein said other surface of said strip is in abutting relation with the top edge of said roofing material.*

*8. A panel in accordance with claim 4 and including a membrane disposed between said sheathing and said roofing material and also between said sheathing and said strip.*

*9. A panel in accordance with claim 8 wherein said membrane extends beyond said strip in a direction away from said roofing material.*

References Cited

The following references, cited by the Examiner, are of record in the patented file of this patent or the original patent.

UNITED STATES PATENTS

| | | | |
|---|---|---|---|
| 2,151,794 | 3/1939 | Peebles | 52—540 |
| 2,164,790 | 7/1939 | Smith | 52—535 X |
| 3,095,671 | 7/1963 | Fink et al. | 52—560 X |
| 3,418,778 | 12/1968 | Foster | 52—560 |
| 3,440,777 | 4/1969 | Martin | 52—560 X |
| Re. 24,246 | 12/1956 | Fink et al. | 52—543 |
| 396,292 | 1/1889 | Richmond | 52—420 |
| 2,285,480 | 6/1942 | Wilde | 52—540 |

OTHER REFERENCES

Popular Mechanics, March 1956, p. 212.

ALFRED C. PERHAM, Primary Examiner

U.S. Cl. X.R.

52—409, 547, 551, 560